United States Patent Office 2,958,027
Patented Oct. 25, 1960

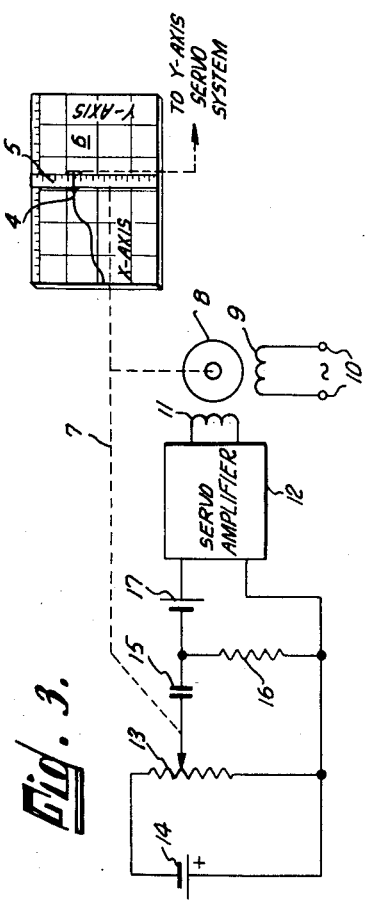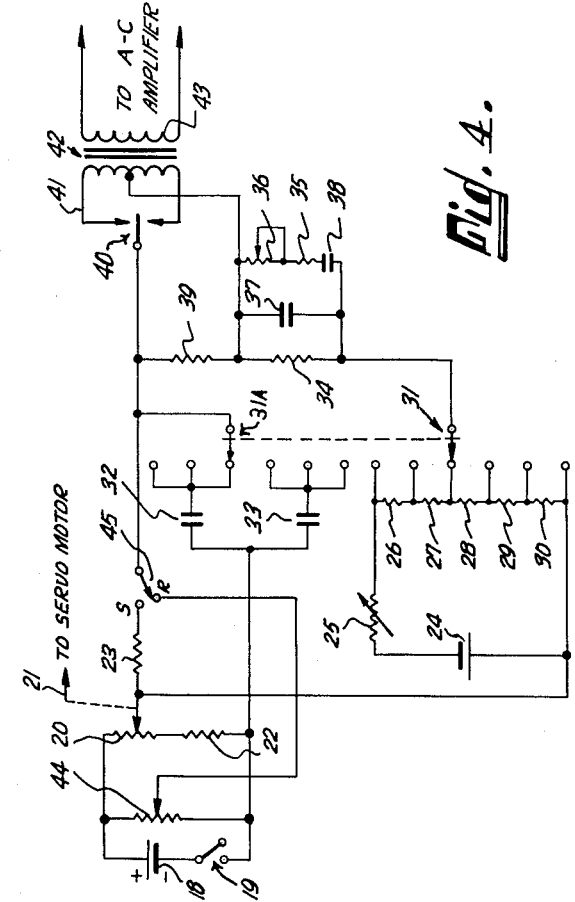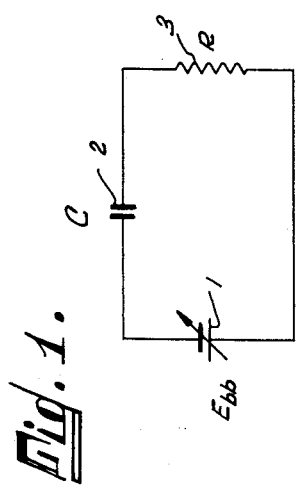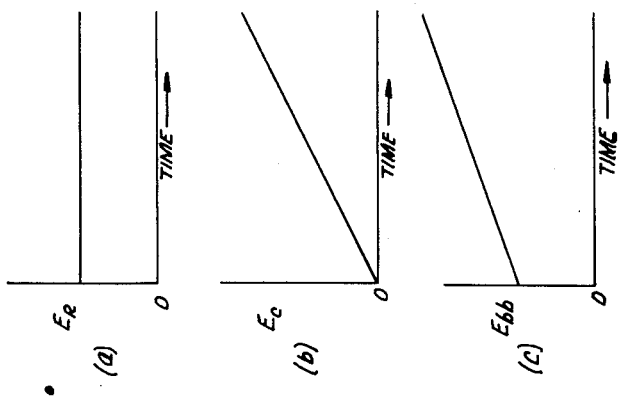

2,958,027

VELOCITY SERVO FOR GRAPHICAL RECORDER TIME BASE GENERATOR

Francis L. Moseley and Andres O. Holdo, Pasadena, Calif., assignors to F. L. Moseley Co., a corporation of California Filed Jan. 2, 1958, Ser. No. 706,742

15 Claims. (Cl. 318—305)

This invention relates to a system for driving a mechanical element at a predetermined rate of travel with respect to time, and more particularly to a system for providing relative movement between a record medium and a marking element in a graphical recorder as a function of time.

Where a record of the relationship between the variations in one quantity with respect to variations in another quantity is required, it is well known to employ a graphical recorder in which a marking element traces a line on a record medium in accordance with the relationship between the variations in the quantities. In many instances, one of the variables is either a linear or non-linear function of time. Where such is the case, a drive system may be employed which is essentially a clock mechanism to establish a time base. For example, a graphical recorder chart may be driven by a synchronous motor which transports the chart at a constant velocity with respect to a pen. By positioning the pen in accordance with variations in a quantity to be recorded, a permanent graph may be provided illustrating the variations of the quantity over a period of time.

Ordinarily, the variations in the quantity being recorded are represented by an electrical signal which may be applied to a servo system which moves the pen in accordance with the variations in the electrical signal.

In recording systems having the capability of recording the relationship between two independent variables which may or may not be related to a time base, it is well known to use a fixed record medium or chart. One servo system may be used to position a marking element in a longitudinal direction along the chart which may be termed the X-axis and a second servo system may be used to position the marking element in a transverse direction which may be termed the Y-axis. Systems which are capable of recording the relationship between two independent variables are generally not readily able to function to record a single variable quantity as a function of time unless a clock mechanism is substituted for the servo system of one axis or an external signal representing time is available to apply to the servo system.

Accordingly, it is one object of the present invention to provide a new and improved system for transporting a mechanical element at a predetermined rate of travel with respect to time.

It is an additional object of the present invention to provide a new and improved graphical recorder including means for generating a time base.

It is still another object of the present invention to provide a closed loop servo system which functions to transport a mechanical element at a predetermined rate of travel with respect to time.

It is yet another object of the present invention to provide a new and improved graphical recorder in which relative movement is provided between a record medium and a marking element as a function of time.

Briefly, in accordance with the invention, a closed loop servo system is provided in which a capacitor and a resistor are connected serially across a variable source of voltage. The servo system is arranged to maintain a value of current flow through the resistor to charge the capacitor at a linear rate by varying the value of the voltage from the source of variable voltage. By linking a mechanical element to the means for varying the value of the voltage, the mechanical element may be transported as a function of time. In a particular embodiment, a balancing potentiometer is connected across a constant source of voltage, a capacitor and resistor are connected serially to the balancing potentiometer, a source of bucking voltage is connected serially with the resistor, a servo amplifier senses a condition of unbalance between the source of bucking voltage and the voltage appearing across the resistor, a servo motor coupled to the servo amplifier positions the potentiometer to maintain a condition of balance between the bucking voltage and the voltage appearing across the resistor, and the marking element of a graphical recorder linked to the servo motor is transported along one axis of the recorder at a constant velocity.

A better understanding of the invention may be had from a reading of the following detailed description and an inspection of the drawings, in which:

Fig. 1 is an explanatory schematic circuit diagram illustrating certain principles involved in the operation of the invention;

Fig. 2 is a set of graphical illustrations displaying the variation of voltages appearing across each of the elements in the schematic circuit diagram of Fig. 1 as a function of time;

Fig. 3 is a combined block and schematic diagram of a simplified form of the invention in a graphical recorder;

Figure 5:
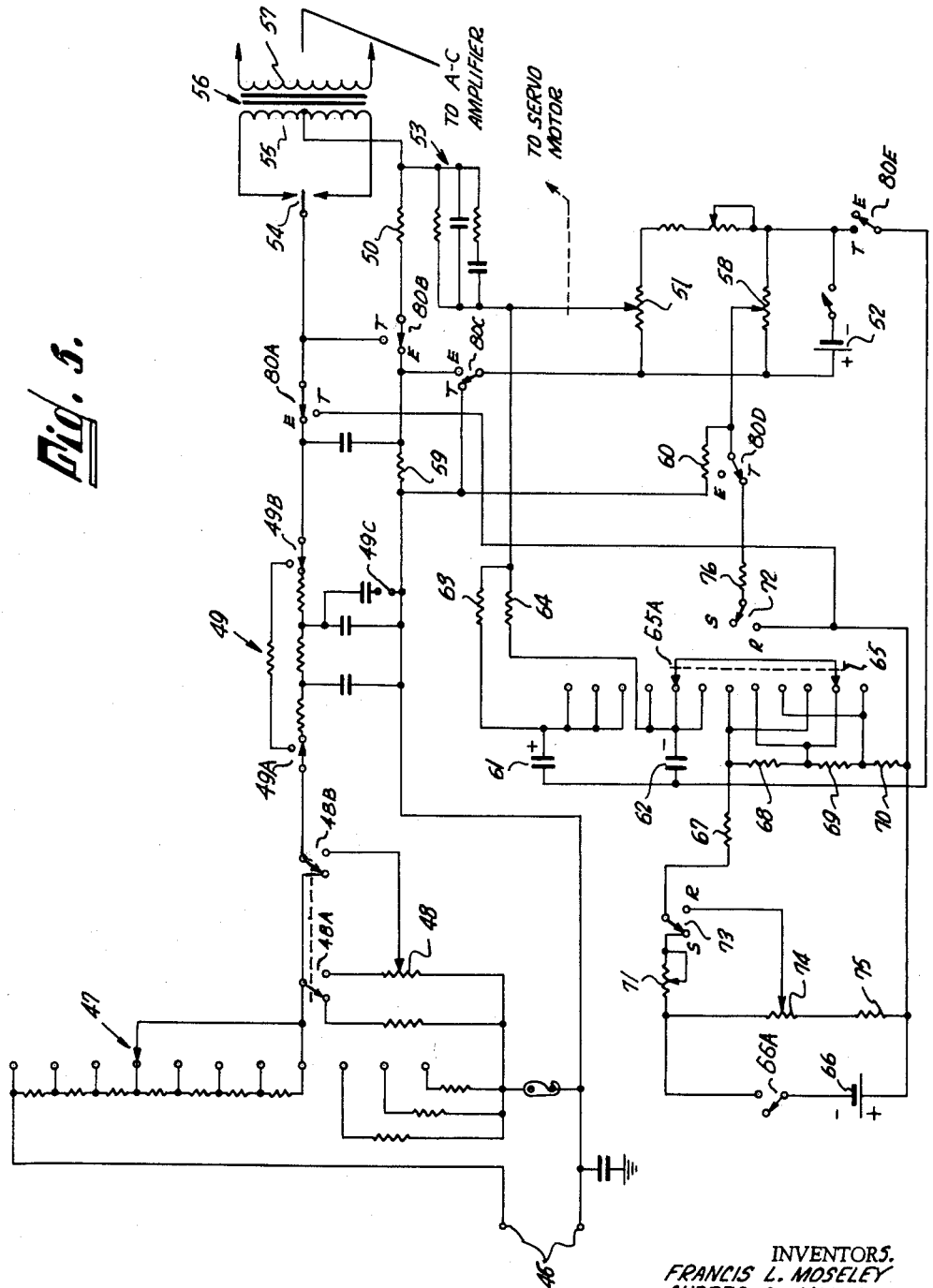

Fig. 4 is a schematic circuit diagram of a preferred embodiment of the invention which may be used in a graphical recorder as a time base generator; and Fig. 5 is a schematic circuit diagram of the input circuit of a graphical recorder including means for selectively switching the apparatus from a position for receiving external signals to a position in which the apparatus may be employed as a time base generator.

In the explanatory circuit diagram of Fig. 1, there is shown a variable source of voltage 1 across which is connected serially a capacitor 2 and a resistor 3. As is well known, where a capacitor commences charging through a resistor from a fixed voltage source, the current through the resistor decreases exponentially. In Fig. 1, it is assumed that some mechanism is provided for varying the value of the source of voltage to maintain the current flow through the resistor 3 constant as shown in Fig. 2(a), so that the voltage across the capacitor 2 increases linearly as shown in Fig. 2(b). Fig. 2(c) illustrates the rise in voltage across the source of voltage 1 required to maintain the current through the resistor constant as shown in Fig. 2(a) and to produce a linearly increasing voltage across the capacitor 2 as shown in Fig. 2(b). Accordingly, Fig. 2(c) illustrates that the voltage from the source of voltage 1 commences at a finite value and increases linearly with time as the sum of the voltages across the resistor 3 and capacitor 2 increases. Where the mechanical control for the voltage from the source of voltage 1 moves linearly with an increase in voltage across the source of voltage 1, it follows that the mechanical control must be advanced linearly with respect to time to cause the voltage from the source of voltage 1 to increase linearly with time and to produce a constant voltage across the resistor 3 as the capacitor 2 charges.

The principles illustrated in Figs. 1 and 2 and described above may be employed to advantage in transporting a mechanical element as a function of time. Fig.

3 illustrates one simple arrangement for transporting a marking element in the form of a pen 4 which is supported on a movable carriage 5 in a graphical recorder having a bed 6 on which may be placed a record medium such as a piece of graph paper. By moving the carriage 5 longitudinally along the bed 6 in an X-axis direction as a function of time, and moving the pen 4 transversely of the bed 6 along the carriage 5 in a Y-axis direction, a graph may be traced on a piece of graph paper on the bed 6 representing the variation in a quantity as a function of time. The movement of the pen 4 along the length of the carriage 5 may be accomplished by linking the pen 4 to a conventional closed loop servo system (not shown) which is adapted to receive electrical signals representing the variable quantity to be recorded and is adapted to move the pen 4 to a position along the Y-axis corresponding to the magnitude of the variable at any given instant in time.

In order to transport the pen 4 along the bed 6, the carriage 5 is mechanically linked as indicated by the dashed line 7 to a conventional servo motor 8. The servo motor 8 includes a pair of windings 9 and 11. An alternating current of fixed phase may be applied to the winding 9 via the terminals 10, and a wave of variable amplitude and reversible phase may be applied to the other winding 11 from a servo amplifier 12.

In a conventional graphical recorder in which a servo system follows the variations in an electrical input signal, the servo amplifier 12 may be connected to a balancing circuit for receiving the input signal and the mechanical linkage 7 may be arranged to adjust a potentiometer in the balancing circuit to generate a balancing signal which is substantially equal and opposite to the input signal. The position of the potentiometer along with the position of the mechanical linkage 7 and the carriage 5 thereby represent the magnitude of the electrical input signal applied to the balancing circuit when the system is balanced.

In contrast, in the apparatus of Fig. 3, a balancing circuit connected to the input of the servo amplifier 12 is arranged to cause the carriage 5 to move along the X-axis of the bed 6 as a function of time. In Fig. 3, a potentiometer 13 and a source of constant voltage 14 cooperate to form a variable source of voltage similar to the source of voltage 1 of Fig. 1. In like fashion, the capacitor 15 of Fig. 3 corresponds to the capacitor 2 of Fig. 1 and the charging resistor 16 of Fig. 3 corresponds to the resistor 3 of Fig. 1.

The servo amplifier 12 of Fig. 3 is connected to the charging resistor 16 and a source of bucking voltage 17. In a balanced state, the bucking voltage 17 is substantially equal and opposite to the voltage appearing across the charging resistor 16 and no error signal is applied to the servo amplifier 12. However, as the current through the charging resistor 16 varies, an error signal is applied to the servo amplifier 12 which causes the servo motor 8 to turn. By virtue of the mechanical linkage, the carriage 5 and the movable contact on the potentiometer 13 are adjusted until the current flow through the charging resistor 16 is restored to its original value and the error signal applied to the servo amplifier 12 disappears.

Assuming that the operation of the apparatus of Fig. 3 commences with the carriage 5 at the left-hand end of the bed 6, with the contactor of the potentiometer 13 at the lower end of the resistance element, the capacitor 15 commences charging through the charging resistor 16 in a manner similar to that described with respect to Fig. 1. A voltage is established by the charging current across the resistor 16 and the servo amplifier 12 senses any unbalance between the bucking voltage 17 and the voltage appearing across the resistor 16. Any unbalance causes the servo motor 8 to turn in a direction which tends to compensate for the unbalance. Thus, as the capacitor 15 charges, the voltage across the resistor 16 tends to drop and the servo motor 8 turns in a direction moving the contactor along the potentiometer 13 to increase the voltage and thereby maintain the voltage across the resistor 16 exactly equal and opposite to the bucking voltage 17.

As in the circuit of Fig. 1, where the relationship between the movement of the contactor and the increase in voltage is linear, the mechanical system moves in a linear fashion to transport the carriage 5 along the length of the bed 6. The rate of travel is dependent upon the value of the capacitor 15, the value of the charging resistor 16 and the magnitude of the bucking voltage 17. By varying these parameters, the carriage 5 may be transported along the length of the bed 6 at any selected velocity. In addition, by choosing a resistance element for the potentiometer 13 which has a non-linear characteristic, the movement of the mechanical linkage 7 in maintaining a state of balance between the voltage across the resistor 16 and the bucking voltage 17 may be made to follow other than a linear relationship with time. For example, the carriage 5 may be transported as a logarithmic function of time if desired.

Fig. 4 illustrates a preferred form of a time base generating circuit including means for re-setting the apparatus to zero position and means for changing the values of the capacitor and the bucking voltage.

The circuit of Fig. 4 includes a constant voltage source such as a battery 18 connected serially with a switch 19 for disconnecting the battery from the circuit when not in use. Connected across the battery 18 is a potentiometer 20, the movable contactor of which may be connected to a servo motor (not shown) by means of a mechanical linkage 21. The potentiometer 20 may be connected serially with a fixed resistor 22 so that at the lower end of the potentiometer 20 a voltage derived from the movable contact causes a current to be passed by the charging resistor 23 which establishes a balance with the bucking voltage.

The bucking voltage in Fig. 4 is derived from a source of voltage 24 which is connected serially with a small variable resistor 25 and a voltage divider comprising the fixed resistors 26, 27, 28, 29 and 30. A switch 31 may be positioned to derive any one of several values of bucking voltage from the voltage divider. The switch 31 may be linked to another switch 31A as shown which connects a selected one of two capacitors 32 or 33 into the circuit. Thus, by positioning the switch 31, a selected value of bucking voltage and an appropriate capacitor is connected into the circuit so that a mechanical system may be transported at any one of several speeds. The small variable resistor 25 in series with the source of bucking voltage 24 affords means for adjusting the bucking voltage to compensate for any variation in the voltage.

Connected between the charging resistor 23 and the source of bucking voltage is a conventional resistance-capacitance network comprising the resistors 34, 35 and 36 and the capacitors 37 and 38 which function in a conventional manner to increase the stability of the servo system.

A resistor 39 connected serially between the stabilizing network and the charging resistor 23 senses any difference in magnitude between the bucking voltage and the voltage appearing across the charging resistor 23. As the voltage appearing across the charging resistor 23 changes, current tends to flow through the resistor 39 so that an error voltage is applied to the movable contact of a conventional single pole double throw vibratory switch 40 which alternately applies the error voltage to opposite ends of the primary winding 41 of an input transformer 42. Accordingly, an amplitude modulated alternating current wave appears across the secondary winding 43 of the transformer 42 which has an amplitude and a phase corresponding to the magnitude and polarity of the error voltage appearing across the resistor 39.

Conventional servo amplifiers of the type illustrated in Fig. 3 generally include means for converting a D.-C.

voltage appearing in an input circuit to a suitable alternating current wave of reversible phase and variable amplitude for application to one winding of a servo motor. A portion of the circuitry shown in Fig. 4 may comprise a part of such a servo amplifier with the vibratory switch 40 functioning to convert a D.-C. error voltage to an alternating current wave which appears across the secondary winding 43 and which may be amplified by a conventional A.-C. amplifier.

As described above in connection with Fig. 3, an amplified alternating current wave may be employed to control the rotation of a servo motor which is connected by a mechanical linkage to the contactor on the potentiometer 20 of Fig. 4 so as to maintain a constant charging current through the charging resistor 23 and substantially zero error voltage across the resistor 39. For this purpose, a conventional A.-C. amplifier may be connected to the secondary winding 43 of the transformer 42 with an amplified wave appearing at the output of the amplifier being applied to one winding of a servo motor as in Fig. 3. Thus, as the selected capacitor of the circuit of Fig. 4 is charged, the contactor of the potentiometer 20 may be transported as a linear function of time where the resistance element of the potentiometer 20 is linear, or may be transported as a non-linear function of time where the resistance element of the potentiometer 20 is non-linear.

Although the component parts of the arrangement of Fig. 4 have been rearranged somewhat from that shown in Fig. 3, the circuit as a whole performs in substantially the same manner as that described above in connection with Fig. 3. For example, a charging circuit from the battery 18 is established via the potentiometer 20, the charging resistor 23, and the switch 45 to a selected one of the capacitors 32, 33, with a return circuit path being provided to the battery 18 via the switch 19. Furthermore, a circuit is provided in the arrangement of Fig. 4 in which the voltage appearing across the charging resistor 23 is balanced against a bucking voltage derived from the battery 24 via the resistors 26—30 and the switch 31, which circuit may be traced from the right hand end of the charging resistor 23 via the switch 45, the resistor 39, the resistor 34, the switch 31, selected ones of the resistors 26—30, and return to the left hand end of the charging resistor 23.

In the circuit of Fig. 4, the switch 31 affords means for including a selected one of six different bucking voltages and the switch 31A affords means for including a selected one of two capacitors to achieve six different velocities of movement of a mechanical element such as a pen in a graphical recorder.

In addition, in Fig. 4, a potentiometer 44 may be connected across the source of voltage 18 and a switch 45 may be arranged to apply a voltage to the circuit which establishes a predetermined state of charge on the selected capacitor 32 or 33 and causes the servo system to transport the mechanical system to a selected zero position. Thus, at the end of a trace or sweep along one axis of a recorder, the switch 45 may be moved to the "R" position to move the marking element of the recorder to a selected zero position in readiness for the next subsequent plotting operation. By positioning the potentiometer 44, the zero position of the mechanical system may be selected at will. The switch 45 may then be returned to the "S" position for the next trace.

The circuit of Fig. 5 illustrates a preferred embodiment of the invention in which the time base generating features of the invention are combined with a conventional input circuit for receiving external signals in a graphical recorder. The switches 80A—80E in various locations in the circuit may be ganged so that in one position the apparatus is adapted to receive an external signal applied to the input terminals 46 and in a second position the circuit functions as an internal time base generator.

Positions of the switches for receiving an external signal are designated "E," while the positions of the switches for use in generating a time base are designated "T." In the "E" position an input signal applied to the terminals 46 is passed by a conventional signal attenuator 47 which includes fixed series connected resistors and a variable scale attenuator potentiometer 48 which may be selectively connected into the attenuator 47 by means of two ganged switches 48A and 48B. The signals passed by the attenuator 47 are applied to a low pass filter 49 which passes signals having frequencies lower than a selectible cut-off frequency in accordance with the positions of the switches 49A, 49B and 49C.

A balancing voltage may be derived from a source, such as a battery 52, by means of the potentiometer 51 for application via the damping network 53 to a resistor 50. In a state of balance substantially no error signal appears at the movable contactor of a vibratory switch 54 and in a state of unbalance the error signal applied to the primary winding 55 of the transformer 56 generates an amplitude modulated alternating current wave across the secondary winding 57 which may be amplified and applied to a servo motor to position the contactor on the potentiometer 51 as described above. Zero offset in the circuit of Fig. 5 may be provided by positioning the contactor of a potentiometer 58 which applies a zero offset voltage to a resistor 59 via a resistor 60. Thus, with the switches 80A—80E in the "E" position, the apparatus of Fig. 5 is adapted to function as a conventional input circuit in a graphical recorder for receiving external signals.

However, by moving the switches 80A—80E to the "T" position, the circuit may be arranged to generate an internal time base to cause the mechanical system of the recorder to be transported as a function of time. The balancing potentiometer 51 and source of voltage 52 are used in the time base position as a variable source of voltage which charges a selected one of the capacitors 61 or 62 via a selected one of two different values of charging resistors 63 and 64. By means of the ganged switches 65 and 65A, a selected one of the charging resistors 63 or 64, a selected one of the capacitors 61 or 62, and a selected value of bucking voltage may be derived from a source such as a battery 66 via the voltage divider of the resistances 67, 68, 69 and 70. As before, a small variable resistor 71 may be connected serially with the voltage divider of the resistors 67—70 to compensate for any variation in the voltage derived from the battery and a switch 66A may be included to disconnect the battery when not in use. Thus, in the apparatus of Fig. 5, all three of the parameters of the basic circuit discussed above in Fig. 1 may be modified to change the velocity of transport of the mechanical element.

In order to re-set the apparatus of Fig. 5 to a predetermined zero position, the switches 72 and 73 may be set to the "R" position in which a re-set voltage is derived from the battery 66 via a potentiometer 74 and the resistors 75 and 76 to cause an error voltage to appear across the resistor 50 which causes a translation of the contactor on the potentiometer 51 to a position in which the voltage derived from the balancing potentiometer 51 is substantially equal and opposite to the re-set voltage. At this point the switches 72 and 73 may be moved to the "S" position at which time a selected one of the capacitors 61 and 62 commences charging through the corresponding one of the resistors 63 and 64 and the servo system functions to sustain a constant value of charging current and substantially zero error signal across the resistor 50 by moving the contactor on the potentiometer 51. As in the case of the apparatus of Fig. 1, a mechanical system including a pen may be linked to the servo motor which drives the contactor of the potentiometer 51 to establish a time base along one axis of a graphical recorder.

By means of the apparatus of the invention, any mechanical element may be transported as a function of time. However, the apparatus has particular advantage in establishing a time base in a graphical recorder as described above, since only a few additional components need be added to the conventional input circuit in the recorder. For example, in Fig. 5, the balancing potentiometer 51 serves the dual purpose of providing a rebalancing voltage for an external signal as well as a charging source during time base operations. Other components likewise serve a dual purpose except for the capacitors, charging resistors, and source of bucking voltage.

The circuits of Figs. 1–5 are illustrative only of various ways in which the invention may be used to advantage in a graphical recorder. Accordingly, the invention is intended to extend to any modifications of the illustrative apparatus or equivalents thereof within the scope of the annexed claims.

What is claimed is:

1. Apparatus including the combination of a resistance, a capacitance connected serially with the resistance, a servo system coupled to the resistance, a variable source of voltage connected across the capacitance and resistance for charging the capacitor through the resistance, and means coupling the servo system to the variable source of voltage for increasing the value of the voltage as the capacitance charges to maintain a constant value of current flow through the resistance.

2. Apparatus including the combination of a capacitor, a charging resistor connected serially with the capacitor, a source of voltage for charging the capacitor through the charging resistor, and means varying the value of the voltage from the source of voltage to maintain the current flow through the charging resistor at a constant value.

3. Apparatus including the combination of a capacitor, a charging resistor connected serially with the capacitor, a source of constant voltage, a potentiometer connected across the source of constant voltage, said potentiometer being connected to said capacitor and charging resistor for charging the capacitor through the charging resistor from the source of voltage, a servo system coupled to the charging resistor, and means coupling the servo system to the potentiometer for maintaining the current flow through the charging resistor at a constant value.

4. A graphical recorder time base generator including the combination of a capacitor, a charging resistor connected serially with the capacitor, a source of constant voltage, a potentiometer having a movable contactor and a resistance element connected across the source of constant voltage, said potentiometer contactor being connected to said capacitor and charging resistor for charging the capacitor through the charging resistor from the source of voltage, a servo system coupled to the charging resistor, and means linking the servo system to the potentiometer contactor for maintaining the current flow through the charging resistor at a constant value.

5. Apparatus for driving a mechanical linkage at a predetermined rate with respect to time including the combination of a capacitor, a charging resistor connected serially with the capacitor, a source of voltage for charging the capacitor through the charging resistor, a servo system coupled to the charging resistor, and a mechanical linkage coupling the servo system to the source of voltage to vary the value of the voltage in accordance with the current flow through the charging resistor whereby said mechanical linkage is driven at a predetermined rate with respect to time.

6. Apparatus including the combination of a source of charging voltage, a potentiometer connected across the source of charging voltage, a capacitor, a resistor connected serially between the capacitor and the potentiometer, a source of bucking voltage connected serially with the resistor, a servo amplifier coupled to the resistor for sensing differences in voltage between the bucking voltage and voltage appearing across the resistor, a mechanical system which is driven by the servo amplifier, and means linking the mechanical system to the potentiometer whereby the mechanical system is moved at a predetermined rate with respect to time and the voltage appearing across the resistor is maintained substantially constant.

7. In a graphical recorder time base circuit the combination of a source of charging voltage, a potentiometer having a contactor and a resistance element connected across the source of charging voltage, a capacitor, a resistor connected serially between the capacitor and the potentiometer, a source of bucking voltage connected serially with the resistor, a servo amplifier coupled to the resistor for sensing differences in voltage between the bucking voltage and voltages appearing across the resistor, a mechanical system which is driven by the servo amplifier, and means linking the mechanical system to the potentiometer contactor whereby the mechanical system is moved at a predetermined rate with respect to time and the voltage appearing across the resistor is maintained substantially constant.

8. Apparatus for moving the marking element of a graphical recorder along one axis at a predetermined rate with respect to time including the combination of a capacitor, a resistor connected serially with the capacitor, a servo system coupled to the resistor, means linking the servo system to the recorder marking element, and a variable source of voltage linked to the recorder marking element and connected across the capacitor and resistor whereby the servo system moves the recorder marking element and varies the voltage from the source of voltage to sustain a constant current through the resistor.

9. Apparatus in accordance with claim 8 in which the variable source of voltage comprises a constant potential source and a potentiometer connected across the constant potential source which is linked to the recorder marking element whereby the potentiometer is adjusted in accordance with the movement of the carriage at a predetermined rate with respect to time.

10. Apparatus for establishing a time base in a graphical recorder in which a record medium and a marking element are moved relative to each other by a mechanical system, including the combination of a balancing circuit, a servo system connected to the balancing circuit for maintaining a state of electrical balance within the balancing circuit, a capacitor connected to the balancing circuit, means charging the capacitor through a portion of the balancing circuit at a predetermined rate, means linking the servo system to a mechanical system whereby the mechanical system is transported at a predetermined rate with respect to time in accordance with the operation of the servo system in maintaining a condition of balance in the balancing circuit, and means producing relative movement between a record medium and a marking element in accordance with the movement of the mechanical system.

11. Apparatus for transporting a mechanical system at a predetermined rate with respect to time including the combination of a balancing circuit, a servo system connected to the balancing circuit for maintaining a state of electrical balance within the balancing circuit, a capacitor connected to the balancing circuit, means charging the capacitor through a portion of the balancing circuit at a linear rate, and means linking the servo system to a mechanical system whereby the mechanical system is transported at a predetermined rate with respect to time in accordance with the operation of the servo system in maintaining a condition of balance in the balancing circuit.

12. In a graphical recorder in which relative movement is produced between a marking element and a record medium as a function of time, the combination of a balancing circuit, a variable source of voltage connected to the balancing circuit for maintaining a state of electrical balance within the balancing circuit, a capacitor connected to the balancing circuit, a resistor connected serially with the capacitor, means charging the capacitor from the variable source of voltage through the resistor, a source of bucking voltage opposing a voltage appearing across the resistor, and a servo system connected to the balancing circuit for adjusting the variable source of voltage to maintain a constant voltage across the charging resistor.

13. Apparatus including the combination of a resistance, a capacitance connected serially with the resistance, a servo system coupled to the resistance, a variable source of voltage connected across the capacitance and resistance for charging the capacitor through the resistance, and means coupling the servo system to the variable source of voltage for increasing the value of the voltage to charge the capacitance at a linear rate with respect to time.

14. Apparatus including the combination of a capacitor, a charging resistor connected serially with the capacitor, a source of constant voltage, a potentiometer connected across the source of constant voltage, said potentiometer being connected to said capacitor and charging resistor for charging the capacitor through the charging resistor from the source of voltage, a servo system coupled to the charging resistor, and means coupling the servo system to the potentiometer for passing current through the charging resistor to charge the capacitor at a linear rate with respect to time.

15. A graphical recorder time base generator including the combination of a capictor, a charging resistor connected serially with the capacitor, a source of constant voltage, a potentiometer having a movable contactor and a resistance element connected across the source of constant voltage, said potentiometer contactor being connected to said capacitor and charging resistor for charging the capacitor through the charging resistor from the source of voltage, a servo system coupled to the capacitor, and means linking the servo system to the potentiometer contactor for passing current through the charging resistor at a rate at which the voltage appearing across the capacitor varies linearly with respect to time.

References Cited in the file of this patent

UNITED STATES PATENTS 2,513,537    Williams _____ July 4, 1950

OTHER REFERENCES

Greenwood, Holdam, MacRae, Electronic Instruments, McGraw-Hill, New York, 1948, page 480.